(12) United States Patent
Mizugaki et al.

(10) Patent No.: US 7,627,329 B2
(45) Date of Patent: Dec. 1, 2009

(54) POSITIONING SYSTEM USING RADIO SIGNAL SENT FROM NODE

(75) Inventors: Kenichi Mizugaki, Kokubunji (JP); Toshiyuki Odaka, Fuchu (JP); Shoichi Masui, Shanghai (CN)

(73) Assignee: Hitachi, Ltd., Tokyo (JP)

( * ) Notice: Subject to any disclaimer, the term of this patent is extended or adjusted under 35 U.S.C. 154(b) by 368 days.

(21) Appl. No.: 10/973,289

(22) Filed: Oct. 27, 2004

(65) Prior Publication Data

US 2005/0130669 A1      Jun. 16, 2005

(30) Foreign Application Priority Data

Nov. 6, 2003    (JP)    ............... 2003-376797

(51) Int. Cl.
*H04Q 7/20* (2006.01)
(52) U.S. Cl. .............. 455/456.1; 455/404.2; 455/456.3; 455/440; 455/457; 455/503; 342/387; 342/464; 342/386; 701/207
(58) Field of Classification Search .............. 455/456.1, 455/404.2, 457; 342/386, 464
See application file for complete search history.

(56) References Cited

U.S. PATENT DOCUMENTS

| | | | | |
|---|---|---|---|---|
| 5,293,645 | A | * | 3/1994 | Sood ................... 455/456.2 |
| 5,960,355 | A | * | 9/1999 | Ekman et al. ............ 455/456.1 |
| 6,574,478 | B1 | | 6/2003 | Mortensen |
| 7,039,421 | B2 | * | 5/2006 | Couronne et al. ........ 455/456.1 |

FOREIGN PATENT DOCUMENTS

| | | |
|---|---|---|
| JP | 7-181242 | 12/1993 |
| JP | 08-122425 | 10/1994 |
| JP | 08-211141 | 2/1995 |
| JP | 2002-291021 | 3/2001 |
| WO | WO 01/23904 A2 | 9/2000 |

OTHER PUBLICATIONS

Ogino et al., "Integrated Wireless LAN Access System-Study on Location System", http://koigakubo.hitachi.co.jp/~cs/default_e.htm, IEICE (1) General Meeting, B-5-203 (2003), pp. 662:1-5.
Ogino et al., "Integrated Wireless LAN Access System-Study on Location Method", Central Research Laboratory, Hitachi, Ltd., (DICOMO 2003), pp. 569-572:1-16.
Office Action from Japanese Patent Office for JP Patent Application No. JP2003-376797 dated May 27, 2008 with English translation.
Notification of Reason(s) for Refusal from the Japanese Patent Office dated Jun. 23, 2009, in Japanese with English translation.

* cited by examiner

*Primary Examiner*—Charles N Appiah
*Assistant Examiner*—Randy Peaches
(74) *Attorney, Agent, or Firm*—Stites & Harbison PLLC; Juan Carlos A. Marquez, Esq.

(57) ABSTRACT

To provide a method of measuring a position of a node by using a radio communication system which comprises the node to send a position measuring signal, and a plurality of base stations to receive radio signals from the node, the method including: the base stations watching signals from the node through a predetermined channel; at least one of the base stations sending a reference signal after receiving of the position measuring signal; at least two of the base stations measuring the reception timing of the position measuring signal and the reception timing of the reference signal; and calculating the position of the node by using the reception timing of the position measuring signal and the reference signal measured by the base stations which have received the reference signal, and position information of the base station which has received the position measuring signal.

23 Claims, 13 Drawing Sheets

US 7,627,329 B2

POSITIONING SYSTEM USING RADIO SIGNAL SENT FROM NODE

CLAIM OF PRIORITY

The present application claims priority from Japanese application P2003-376797 filed on Nov. 6, 2003, the content of which is hereby incorporated by reference into this application.

BACKGROUND OF THE INVENTION

This invention relates to a position measuring system including a node which has a radio transmitter and an access point used as a radio base station in the system.

As a representative conventional node position measuring method, there has been available a method of measuring a position by using a signal from a satellite such as a GPS.

As another node position measuring method, there has been available a method of receiving signals sent from a plurality of base stations by a node and calculating a position of the node based on a reception timing difference of the signals.

Specifically, regarding a cellular telephone system, there has been proposed a method of calculating reception timing differences of signals sent from base stations to a mobile terminal (propagation time differences of signals T1−T2 and T3−T2 from the base stations to the mobile terminal), multiplying the propagation time differences by a light velocity to calculate propagation distance differences of signals from the mobile terminal to the base stations by equation (1).

$$D1-D2=c(T1-T2)$$
$$D3-D2=c(T3-T2) \quad (1)$$

And a position of the moving terminal is detected (refer to JP7-181242A).

Furthermore, regarding a radio LAN system, there has been proposed a method of calculating a reception timing difference of signals sent from a node (terminal) and received by base stations (reception timing difference Ti−T1 between the base stations), multiplying the reception timing difference by a light velocity to calculate a propagation distance difference of the signals from the node to the base stations by equation (2).

$$\{|P-Pi|-|P-P1|\}=c(Ti-T1), i=2,\ldots,n \quad (2)$$

And a position of the node is detected (refer to Atsushi Ogino et al. p. 662 B-5-203, "Wireless LAN Integrated Access System (1) Studies on Position Detecting System", 2003 General Meeting Collected Lecture Papers, Institute of Electronics, Information and Communication Engineers).

In the method in which the signal from the satellite such as a GPS is used, a special receiver or antenna is necessary, making it difficult to miniaturize the node and to achieve low power consumption. This method can only be used outdoors to receive a radio wave from the satellite. Thus, if the node is used indoors, there is a method of disposing receiving stations at several places to receive radio waves from the node and approximating a position of a receiving station which can receive a signal to that of the node. According to this method, however, since position measuring accuracy depends on a distribution density of the receiving stations, many receiving stations must be distributed to detect an accurate position of the node.

Additionally, in the method of causing the node to receive the signals sent from the plurality of base stations and: calculating the position of the node based on the reception timing difference, clocks of the base stations must be synchronized with one another before the sending of the signals. Accordingly, it is impossible to measure a position at the moment when the node detects an abnormality. Besides, the node needs to have a receiver, so that it makes difficult to miniaturize the node and to achieve lower power consumption.

SUMMARY OF THE INVENTION

According to an embodiment of this invention, there is provided a method of measuring a position of a node by using a radio communication system which includes the node having a transmitter which sends a position measuring signal, and a plurality of base stations having a receiver which receives a position measuring signal and a reference signal. The method includes at least one of the base stations to sending a reference signal after receiving of the position measuring signal, at least two of the base stations to measuring a reception timing of the position measuring signal and a reception timing of the reference signal, and calculating the position of the node by using the reception timings of the position measuring signal and the reference signal measured by the at least two base stations, and position information of the plurality of base stations.

According to this invention, the position of the node can be measured even if the node has no receiver, thereby making it possible to simplify a structure of the node and to miniaturize the node.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

A first embodiment of this invention will be described with reference to the accompanying drawings.

Figure 1:
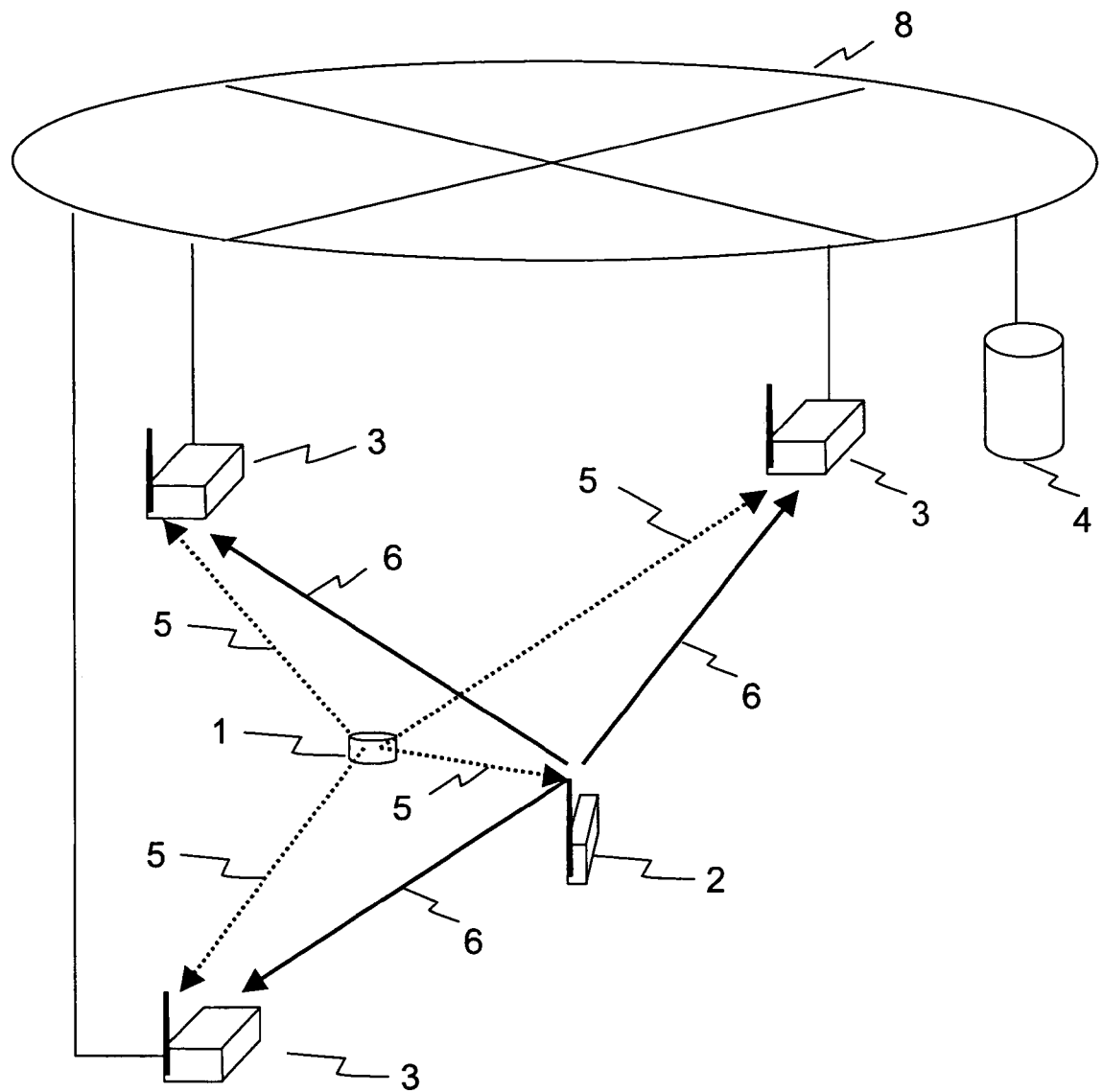
FIG. 1 is a configuration diagram of a positioning system according to a first embodiment of this invention.

FIG. 1 is a configuration diagram showing a positioning system according to the first embodiment of the invention.

A node 1 sends a radio signal (positioning signal) 5 to measure a position. A reference station 2 sends a radio signal (reference signal) 6 to establish a reference time after receiving of the signal from the node 1. An access point (AP) 3 measures reception timings of the positioning signal 5 sent from the node 1 and reception timings of the reference signal 6 sent from the reference station 2. A position calculation server 4 includes a database (not shown) which stores information of coordinates of each access point 3 and a distance from each access point 3 to the reference station 2. The position calculation server 4 is connected to each access point 3 through a network 8. The position calculation server 4 calculates a position of the node 1 by using a result of measurement obtained from each access point 3 through the network 8, and the information stored in the database.

Figure 2:
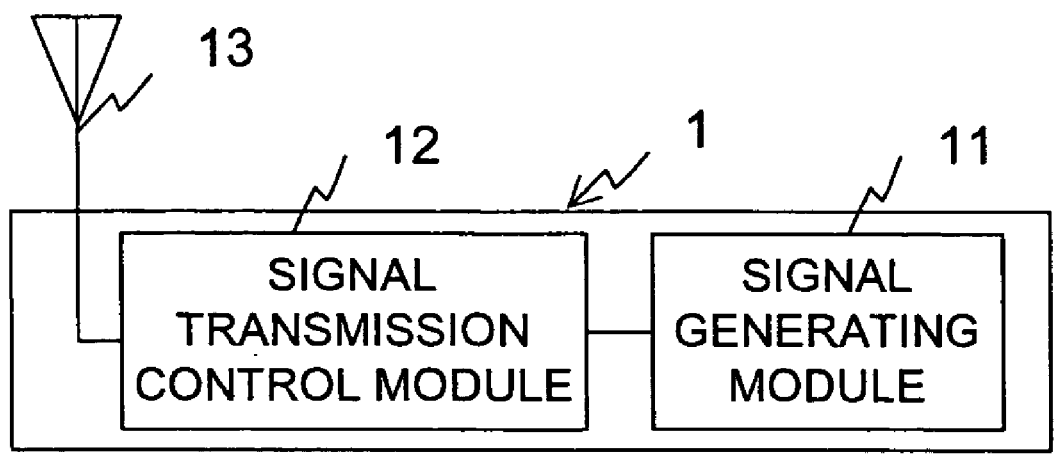
FIG. 2 is a block diagram of a node according to the first embodiment of the invention.

FIG. 2 is a block diagram showing a configuration of the node 1.

The node 1 includes a signal sending control module 11, a signal generating module 12, and an antenna 13.

The signal sending control module 11 decides the timing when the node 1 sends the positioning signal based on information or the like from a sensor (e.g., sensor for detecting an abnormal situation around the node) or a timer (not shown) incorporated or connected to the node 1.

The signal generating module 12 receives a command from the signal sending control module 11 to generate a positioning signal, and sends the signal from the antenna 13. This positioning signal has a waveform uniquely allocated to each node 1, Therefore, the positioning signal makes it possible to identify the node 1 by the waveform of the positioning signal.

The node 1 may send the information obtained from the sensor or the like to the access point 3 through radio communication.

The reference station 2 receives at least the positioning signal 5 sent from the node 1, and then sends the reference signal 6 of a unique waveform.

Figure 3:
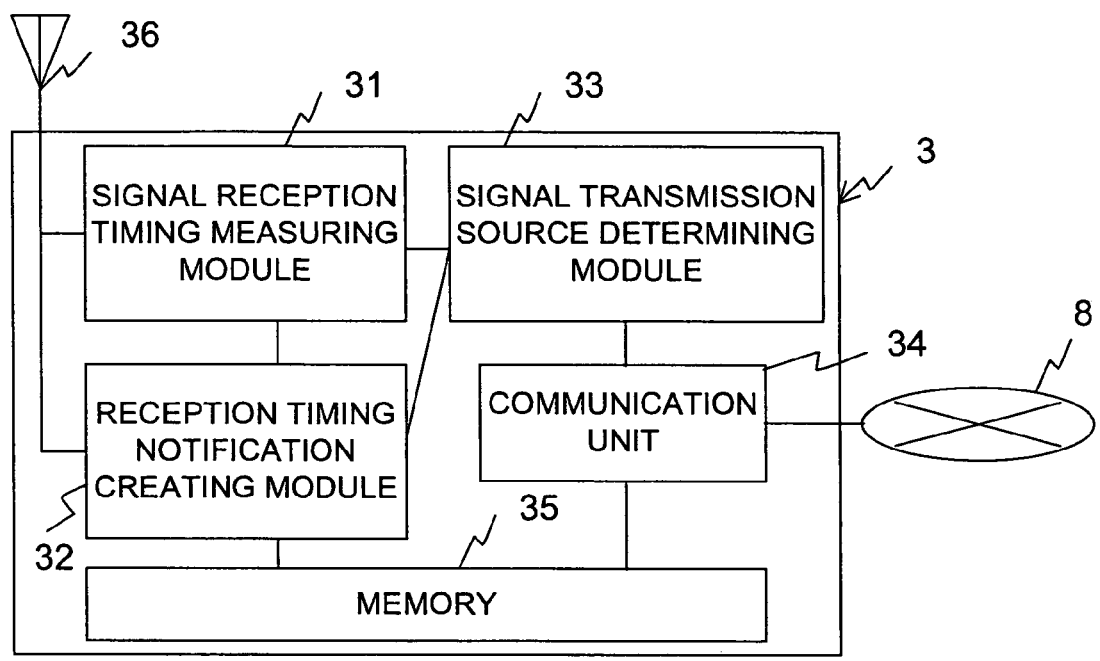
FIG. 3 is a block diagram of an access point according to the first embodiment of the invention.

FIG. 3 is a block diagram showing a configuration of the access point 3. The access point 3 is provided with a signal reception timing measuring module 31, a signal sending source determining module 32, a reception timing notification creating module 33, a communication unit 34, a memory 35, and an antenna 36.

The signal reception timing measuring module 31 measures the reception timings of the positioning signal 5 sent from the node 1 and a reception timing of the reference signal 6 sent from the reference station 2.

The signal sending source determining module 32 identifies the node 1 and the reference station 2 which has sent the signal based on information that is included in the signal received by the access point 3.

For example, in a system including a plurality of nodes 1, each node 1 sends a positioning signal 5 of a unique waveform. In the memory 35, a unique waveform corresponding to each node 1 is recorded. The signal sending source determining module 32 compares a waveform of the received positioning signal 5 with the waveform recorded in the memory 35, and identifies the node 1 which has sent the positioning signal 5.

Additionally, for example, in a system including a plurality of reference stations 2, each reference station 2 sends a reference signal 6 of a unique waveform. This waveform does not need to be unique to each of all the reference stations 2. When the same access point 3 is not able to receive the reference signals 6 sent from two of the reference stations 2, the two reference stations 2 may use the same waveform.

The access point 3 records the waveform of the received reference signal 6. In the memory 35, a unique waveform corresponding to each reference station 2 is recorded. The signal sending source determining module 32 compares the waveform of the received reference signal 6 with the waveform recorded in the memory 35, and determines that the signal has been sent from a reference station 2 corresponding to a closest waveform. As a method of comparing the unique waveform with that of the received reference signal 6, for example, there is available a method of calculating a correlation value of both, and determining a waveform of a largest correlation value to be the closest waveform.

Each of the signal reception timing measuring module 31 and the signal sending source determining module 32 sends the obtained information to the reception timing notification creating module 33. The reception timing notification creating module 33 creates a reception timing notification message which includes information on a difference between the reception timing of the positioning signal 5 and the reception timing of the reference signal 6, information identifying the node 1 of the sending source, and information identifying the reference station 2 of the sending source (reference station ID).

The communication unit 34 is an interface to connect the access point 3 to the network 8, and sends the reception timing notification message created by the reception timing notification creating module 33 to the position calculation server 4 through the network 8.

In this case, the access point 3 may determine only a type of the received waveform by the signal transmitting source determining module 32, and send a result of the determination to the position calculation server 4. Then, the position calculation server 4 may identify the reference station 2 which has sent the reference signal 6 based on the position of the access point 3 and the received type of the waveform.

Furthermore, by using the same signal waveform, each reference station 2 may send the reference signal 6 including information identifying the reference station (e.g., unique identifier of the reference station 2). Then, upon receiving of the reference signal 6, the access point 3 may identify the reference station 2 which has sent the reference signal 6 by referring the identifier of the reference station.

The communication unit 34 may have a function of controlling radio communication, and communicate with the node 1 by radio.

Figure 4:
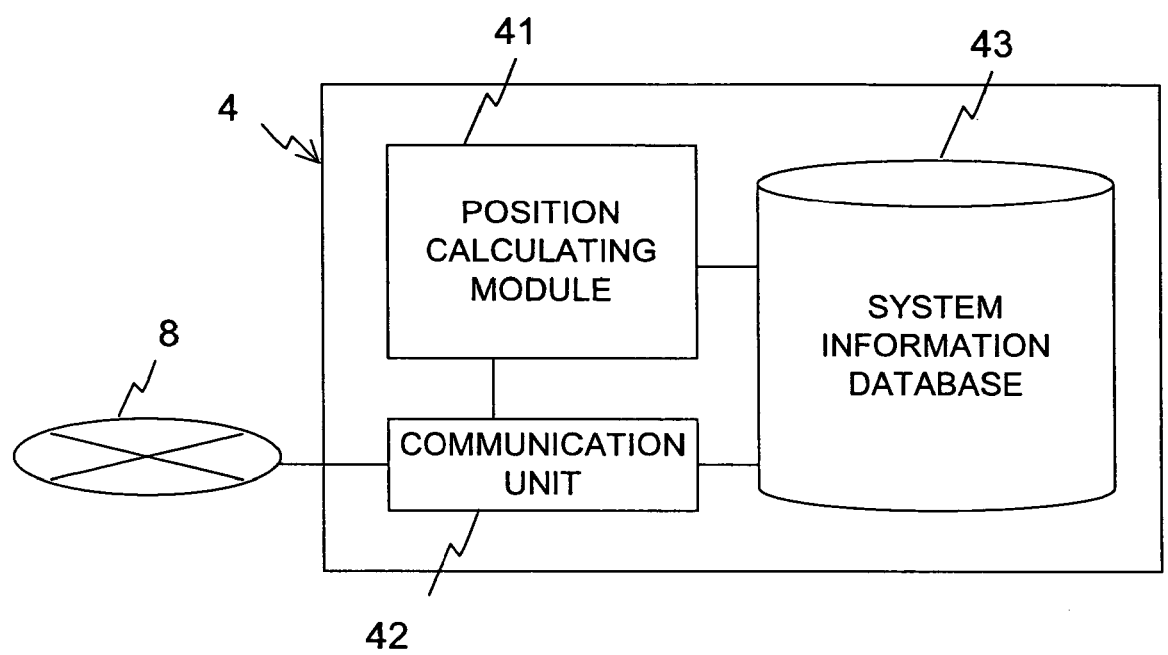
FIG. 4 is a block diagram of a position calculation server according to the first embodiment of the invention.

FIG. 4 is a block diagram showing a configuration of the position calculation server 4.

The position calculation server 4 is provided with a position calculating module 41, a communication unit 42, and a system information database 43.

The communication unit 42 is an interface to connect the position calculation server 4 to the network 8, receives a reception timing notification sent from the access point 3, and sends the notification to the position calculating module 41.

The position calculating module 41 calculates a position of the node 1 based on a signal reception timing difference between the access points 3 included in the reception timing notification and information of the position. The information of the position includes position of each access point 3 and the position of the reference station 2, and these positions are obtained from the system information database 43.

Figure 5:
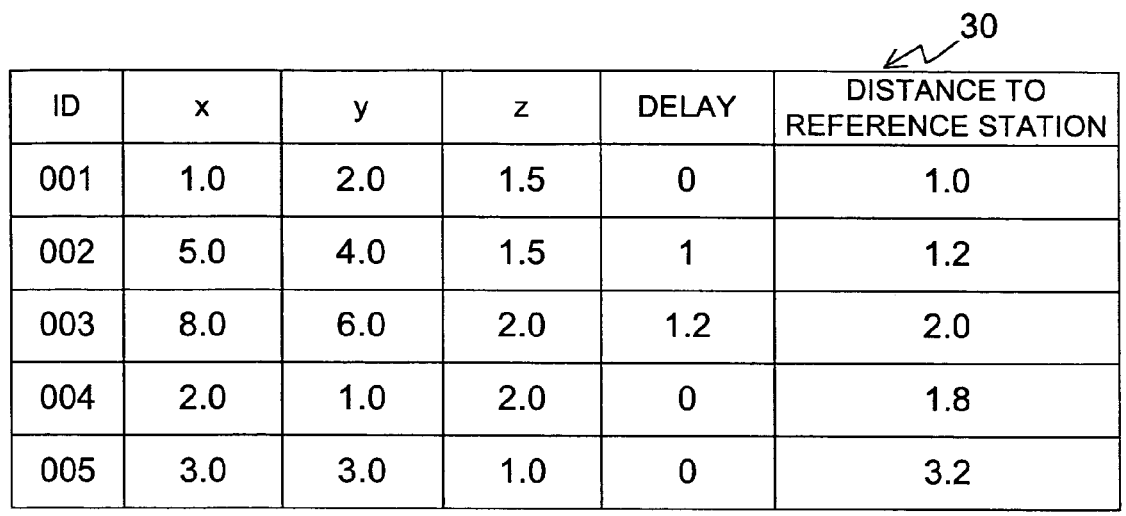
FIG. 5 is a configuration diagram of a table recorded in a system information database included in the position calculation sever according to the first embodiment of the invention.

FIG. 5 is a configuration diagram showing a table recorded in the system information database 43 included in the position calculation server 4.

Referring to FIG. 5, IDs are used to identify a plurality of access points 3. Each set of x, y, and z shows a distribution position of each access point 3 indicated in x-, y-, and z-coordinates. A delay is a processing delay time unique to each access point which is decided by an antenna, a length of a cable, or the like of the access point 3. The server 4 corrects a delay time by using data of the delay when it calculates a difference between the positioning signal reception timing and the reference signal reception timing. A distance to a reference station represents a distance between each access point 3 and the reference station 2.

In the system information database 43, the coordinates of the reference station may be recorded instead of the distance to the reference station. Alternatively, a transmission time of the reference signal from the reference station to each access point may be recorded.

Figure 7:
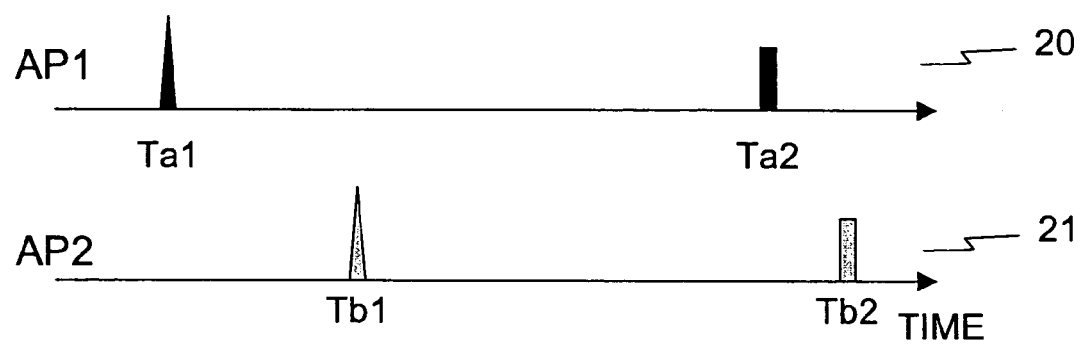
FIG. 7 is a timing chart of a signal reception timing measured by each access point according to the first embodiment of the invention.
Figure 8:
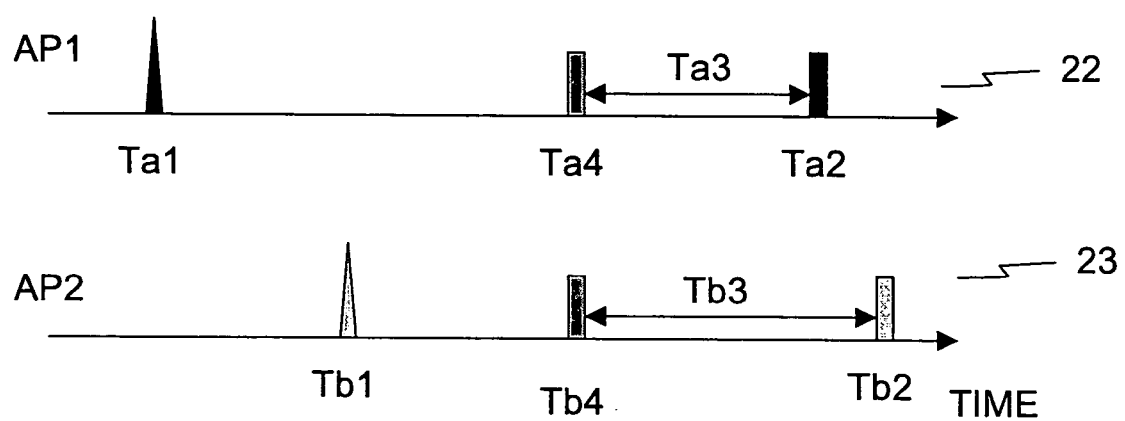
FIG. 8 is a timing chart of a transmission timing of a reference signal calculated by the position calculation server according to the first embodiment of the invention.

Next, referring to FIGS. 6 to FIGS. 8, a method of measuring the position of the node 1 according to the first embodiment of the invention will be described.

Figure 6:
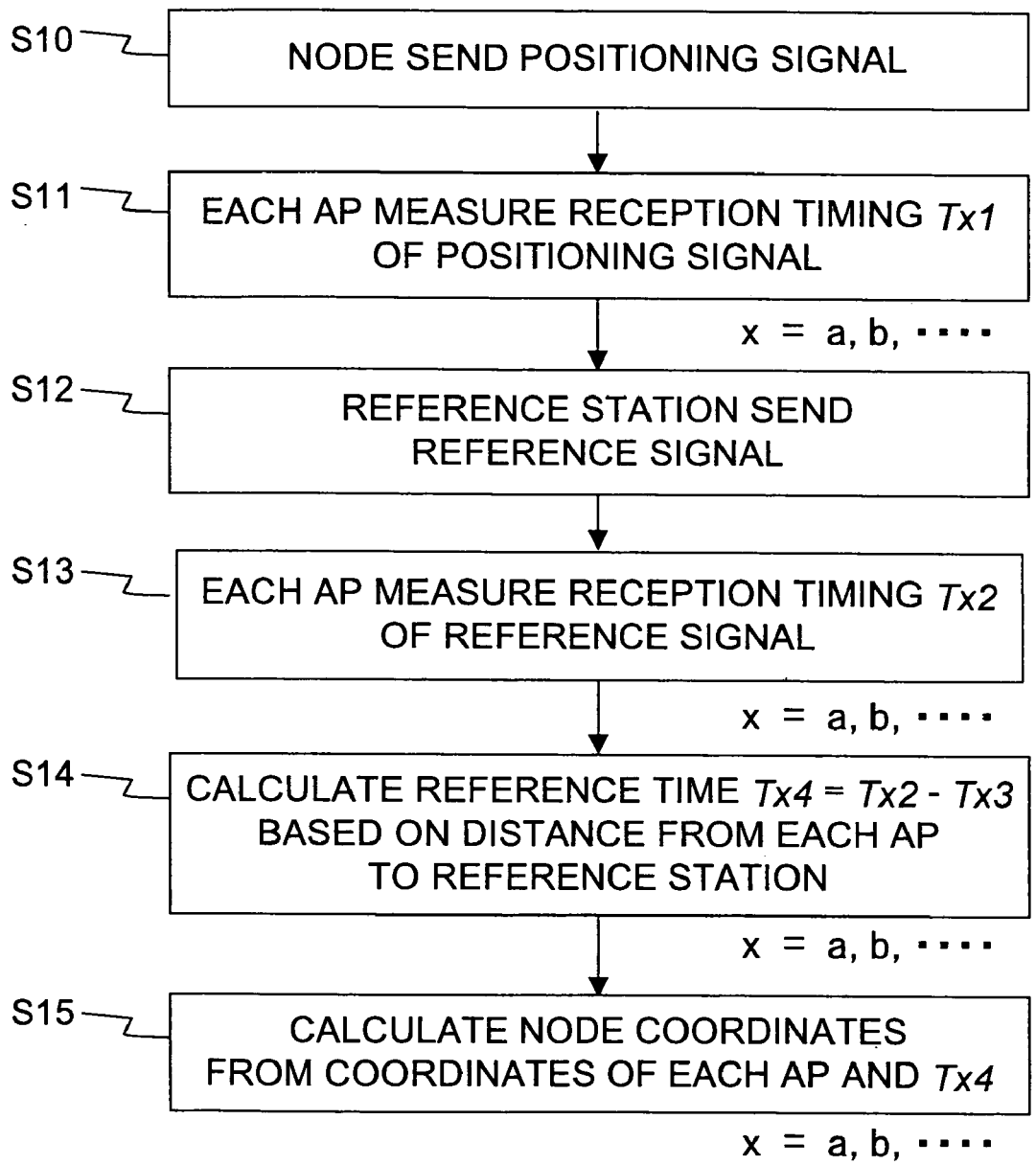
FIG. 6 is a flowchart of processing of measuring a position of the node according to the first embodiment of the invention.

FIG. 6 is a flowchart showing the processing of measuring the position of the node 1 according to the first embodiment of the invention.

FIG. 6 shows an example, which is measurement of a reception timing difference between two access points (AP1 and AP2). First, the node 1 sends the positioning signal 5 (S10). The AP1 measures the reception timing Ta1 of the positioning signal 5 sent from the node 1. The AP2 measures the reception timing Tb1 of the positioning signal 5 sent from the node 1 (S11). The positioning signal 5 is, e.g., a pulse procession formed of a plurality of pulses. The AP1 and the AP2 calculate a correlation value between the received waveform and the prestored reference waveform, and sets the time with the largest correlation value as the reception timing.

On the other hand, the reference station 2 monitors the positioning signal 5 sent from the node 1 in a normal state, and is on a watching mode to receive the positioning signal 5. Upon receiving of the positioning signal 5 sent from the node 1, the reference station 2 sends a reference signal 6 to the AP1 and the AP2 to set a common reference time (S12). Then, as shown in FIG. 7, the AP1 measures the reception timing Ta2 of the reference signal 6. The AP2 measures the reception timing Tb2 of the reference signal 6. The measured the reception timings Ta2 and Tb2 of the reference signal 6 are sent to the position calculation server 4.

The position calculation server 4 calculates signal transmission the delay times Ta3 and Tb3 from the reference station 2 to the AP1 and the AP2, respectively, by using information on distances from the reference station 2 to the AP1 and the AP2 (dividing a distance between the access point and the reference station by the speed of light). Subsequently, in step S14, the position calculation server 4 calculates the times Ta4 and Tb4 by equation (3).

$$Ta4(=Ta3-Ta2)$$

$$Tb4(=Tb3-Tb2) \quad (3)$$

The times Ta4 and Tb4 (times obtained by backing the timings Ta2 and Tb2 from the times Ta3 and Tb3, respectively) are times when the reference station 2 sends the reference signal (S14). Referring to FIG. 8, since the times Ta4 and Tb4 are identical, the times of the AP1 and the AP2 can be synchronized by using the Ta4 and the Tb4 as references.

The position calculation server 4 obtains a difference between the positioning signal reception timings Ta1 and Tb1 based on the times Ta4 and Tb4 (Ta4−Ta1, Tb4−Tb1), and calculates the position of the node 1 by using this difference (Ta4−Ta1, Tb4−Tb1) and the coordinates of the AP1 and the AP2 (S15).

A method of calculating the position of the node 1 is, for example, hyperbolic position location, calculating a difference in distance between the positioning target node 1 and the access points thereof based on a difference in positioning signal reception timing between the two access points, and specifying a position of the positioning target node 1 from an intersection of at least two hyperbolic curves drawn by connecting points which satisfy conditions of the distance difference. Alternatively, hyperbolic position location may be used which executes weighting based on receiving strengths of the positioning signal 5 and the reference signal 6 received by the access point 3 during the position calculation executed by using the difference between the reference signal transmission timing and the positioning signal reception timing.

According to the above method with weighting, when the reception timings of three or more access points are measured, and draw three or more hyperbolic curves. Weighting factors are given to intersections of the hyperbolic curves based on the receiving strengths of the positioning signal 5 and the reference signal 6 used for drawing the hyperbolic curves. Then the position of the positioning target node 1 is specified by averaging with the weights of the coordinates of the intersections.

When the reference station sends the reference signal by a plurality of times, an average of reception timings is calculated. By using the average of the reception timings of the reference signal received by the plurality of times, it is possible to reduce errors caused by a temporary change of the receiving condition. Moreover, it is possible to measure the reception timing of the reference signal 6 with more a minimum accurate of the measurement of the reception timing. In other words, since minimum resolution at which the access point 3 measures the reception timing of the reference signal 6 depends on a sampling clock, a maximum error is ½ of a clock at the measured timing. However, by averaging the reception timings of the reference signal sent by the plurality of times, this error can be reduced. Besides, it is possible to reduce an influence of external disturbances such as noise.

Figure 9:
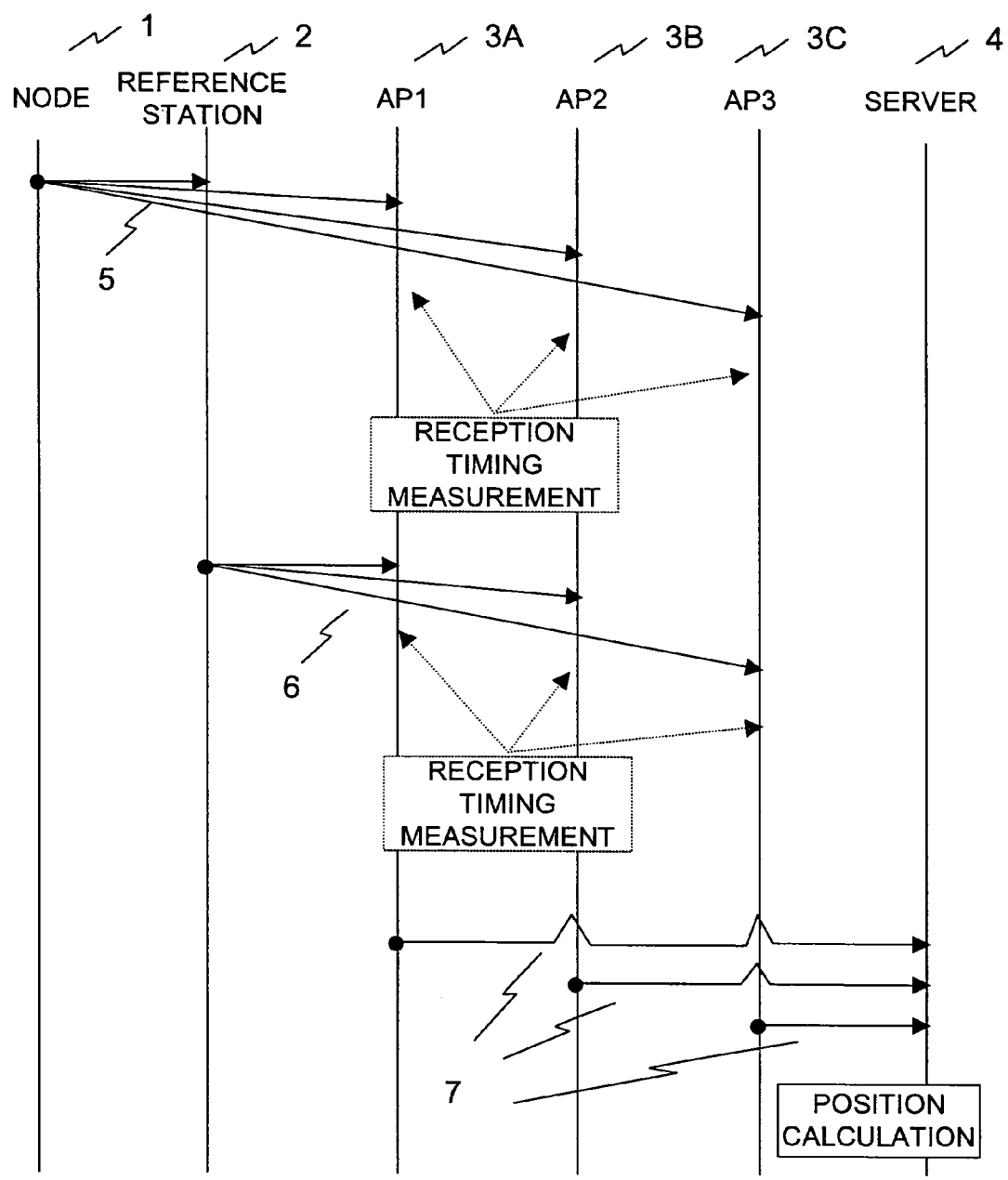
FIG. 9 is a sequential diagram of a signal transmission process in the positioning system according to the first embodiment of the invention.

FIG. 9 is a sequential diagram showing a signal transmission process in the positioning system of the first embodiment of the invention.

The node 1 sends the positioning signal 5 to the surrounding access points 3A, 3B, and 3C and the reference station 2 at a timing when position calculation is desired (e.g., periodically, or when the sensor equipped in the node detects an abnormality). Each of the access point 3 measures a reception timing (T×1) of the positioning signal 5. The reference station 2 sends the reference signal 6 after the receiving of the positioning signal 5. Each access point measures the reception timing (T×2) of the reference signal 6. Each of the access point 3 sends a reception timing notification 7 to the position calculation server 4 through the network 8. The reception timing notification 7 includes the reception timing (T×1) of the positioning signal 5, the reception timing (T×2) of the reference signal 6, and an ID to identify the access point.

The position calculation server 4 calculates a transmission delay time (T×3) using the reception timing (T×2) of the reference signal 6 included in the reception timing notification and the distance to the reference station recorded in the database 43 of the position calculation server 4. Then the position calculation server 4 calculates a transmission timing (T×4) of the reference signal 6.

In this case, when the database 43 has information of a signal transmission delay time from the reference station 2 to the access point 3 recorded therein instead of a distance to the reference station, the information may be used to calculate the reference signal transmission timing. When the database 43 has information of the coordinates of the reference station 2 recorded therein, the information and coordinate information of the access point 3 may be used to calculate a distance between the reference station 2 and each access point 3, and calculate the reference signal transmission timing. When the reception timing notification 7 sent from the access point 3 to the position calculation server 4 includes a difference between the reception timing of the reference signal and the reception timing of the positioning signal (T×2−T×1), the position calculation server 4 may calculate a difference between the reception timing of the positioning signal and the transmission timing of the reference signal (T×4−T×1).

Next, description will be made of a method of selecting a reference station 2 which sends the reference signal 6 when a plurality of reference stations 2 are included in one positioning system according to the first embodiment.

Upon receiving of the positioning signal 5, the reference station 2 measures strength of the positioning signal 5. The reference station 2 sends the reference signal 6 with a passage of a predetermined delay time after the receiving of the positioning signal 5. This predetermined delay time is shorter as the measured signal strength is higher, and longer as the measured signal strength is lower. The reference station 2 that receives a reference signal 6 sent from the other reference station 2 before the passage of the predetermined delay time dose not send reference signal 6 even after the passage of the predetermined delay time. By setting the predetermined delay time to a value larger than a maximum value of a radio wave transmission time between the reference stations 2, only the reference station 2 that receives a strongest positioning signal 5 eventually sends a reference signal 6.

Thus, by deciding the time until sending of the reference signal 6 based on the strength of the received signal, it is possible to uniquely decide the reference station 2 which sends the reference signal 6. Further, since signals of a better communication condition are used, a detection result of a receiving timing is more reliable. Therefore, positioning accuracy can be guaranteed higher, the reference station having a high communication strength of the positioning signal can be set as a sending station of the reference signal 6. This is because the reference station 2 having the highest strength of the received signals has the best condition of a communication path between the node 1 and the reference station 2. In general, the reference station 2 is thought to be near the node 1 because of its high signal strength. Thus the reference signal 6 sent therefrom can be expected to be received with a sufficient communication quality at the other access point 3 which has received the positioning signal 5.

According to the above method, the reference station 2 can send a reference signal 6 even after the receiving of the reference signal 6 sent from the other reference station 2, and the access point 3 can choose not to send a reception timing of a reference signal 6 other than the first-received reference signal 6 to the position calculation server 4. As a result, the reference signal 6 of the reference station 2 which has received the strongest positioning signal 5 is used for position calculation.

Alternatively, the position calculation server 4 may select reference stations used for position calculation from a plurality of reference stations. In this case, upon receiving of two or more reference signals 6, the access point 3 sends, to the position calculation server 4, an interval between the reception timing of the positioning signal 5, a reception timing of each reference signal 6, and an ID of each reference station which has sent the reference signal 6. For example, upon receiving of two reference signals 6 after the positioning signal 5, the access point 3 sends, to the position calculation server 4, information of the time from the receiving of the positioning signal 5 to the receiving of a first reference signal 6 and a time from the receiving of the positioning signal 5 to the receiving of a second reference signal 6 (or information of reception timings of the positioning signal 5 and reference signals 6). Furthermore, the access point 3 sends, to the position calculation server 4, information identifying the reference station obtained from each reference signal 6.

The position calculation server 4 decides a reference signal used for position calculation based on the information sent from each access point 3.

Figure 10:
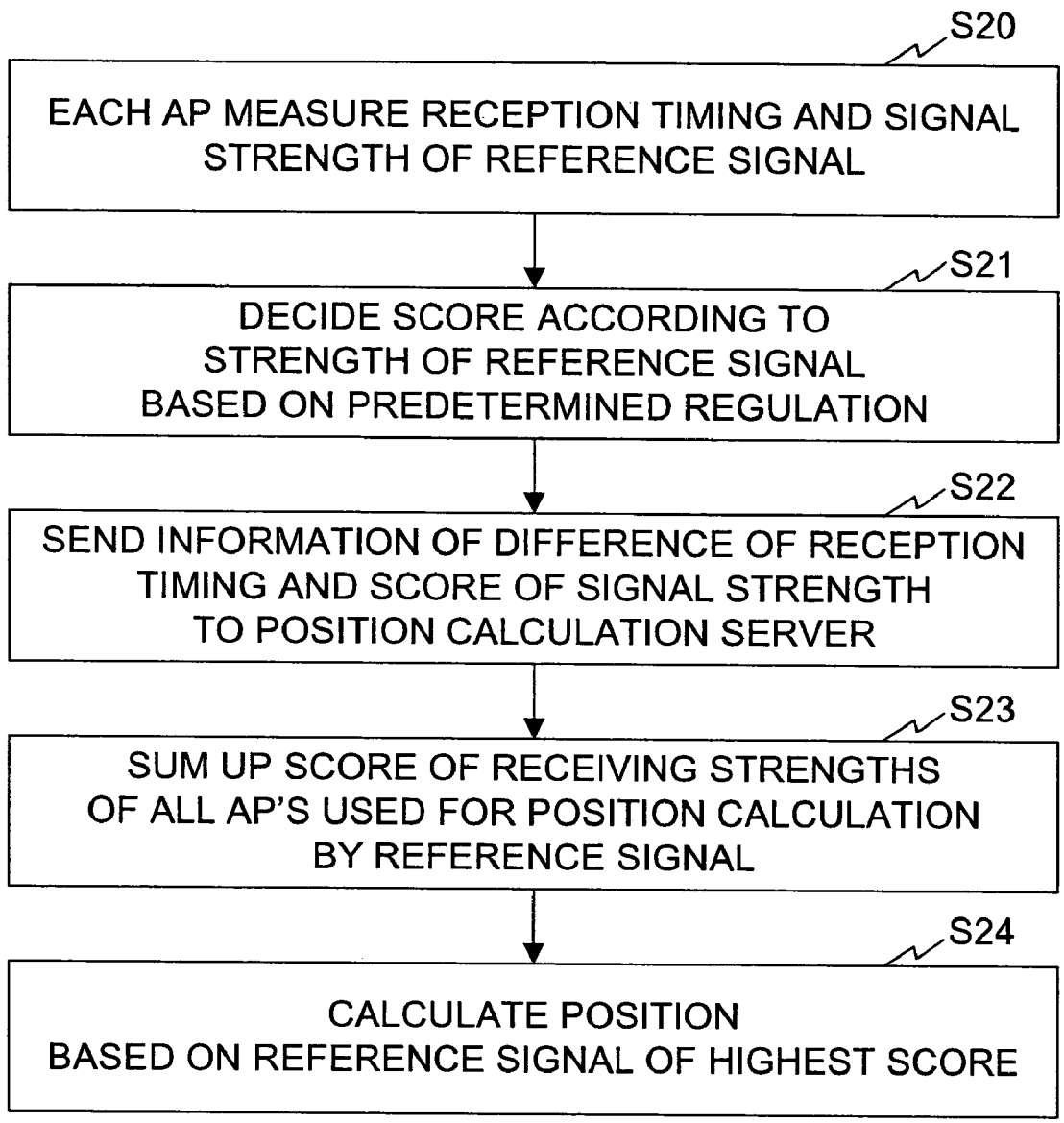
FIG. 10 is a flowchart of a processing of selecting a reference signal according to the first embodiment of the invention.

FIG. 10 is a flowchart showing a processing of selecting a reference signal based on a received signal strength when a plurality of reference signals are received.

Upon receiving of the reference signal 6, each access point 3 measures its strength (S20), and grades the received signals for their strength according to predetermined regulations. For example, a signal of a highest strengths grades A, and signals of lower strengths grade B, C, D, ... Each access point 3 gives scores to each reference signal 6 according to the grade of the signal strength (S21). For example, a score of the reference signal of the grade A is 5, and a score of the reference signal of the grade B is 4. Each access point 3 sends, to the position calculation server 4, information of the score of each reference signal 6 in addition to information of a difference between the reception timing of the positioning signal 5 and the reception timing of each reference signal 6 (or information of the reception timings of the positioning signal 5 and the reference signals 6) and a reference station ID corresponding to each reference signal 6 (S22). The access point may send the information of the grade of the received signal to the server, and the information of the grade may be converted into a score at the position calculation server.

The position calculation server 4 sums up the scores of the reference signals sent from the plurality of access points 3 used for position calculation on the basis of per reference signal (S23), and executes positioning calculation by using a reference signal of a highest sum of scores (S24).

For example, a reference station ID of a first reference signal received by a first access point 3 is 21 and the first reference signal received by the first access point 3 has a signal strength of grade A. A reference station ID of a second reference signal received by the first access point 3 is 22 and the second reference signal received by the first access point 3 has a signal strength of grade B. A reference station ID of a first reference signal received by a second access point 3 is 22 and the first reference signal received by the second access point 3 has a signal strength of grade A. A reference station ID of a second reference signal received by the second access point 3 is 21 and the second reference signal received by the second access point 3 has a signal strength of grade A. A reference station ID of a first reference signal received by a third access point 3 is 21 and the first reference signal received by the third access point 3 has a signal strength of grade A. A reference station ID of a second signal received by the third access point 3 is 22 and the second reference signal received by the third access point 3 has a signal strength of grade B.

In this case, the sum of scores is 15 for the reference signals sent from the reference station (reference station 21) whose ID is 21, and the sum of scores is 13 for the reference signals sent from the reference station (reference station 22) whose ID is 22. The score is higher for the reference signal sent from the reference station 21 than the score for the reference signal sent from the reference station 22. Accordingly, the position calculation server 4 executes position calculation by using the reception timing difference between the reference signal sent from the reference station 21 and the positioning signal, and position information of the reference station 21 obtained from the reference station ID based on the reference signal.

Figure 11:
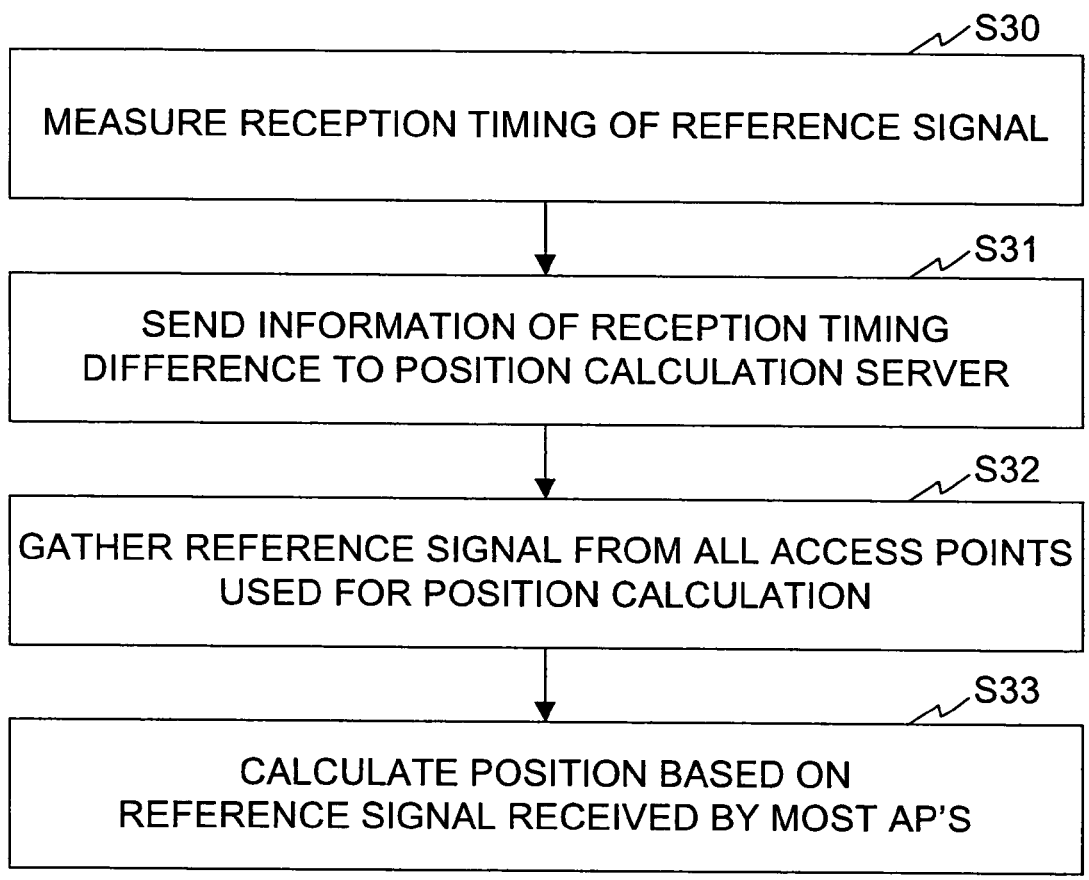
FIG. 11 is a flowchart of another processing of selecting a reference signal according to the first embodiment of the invention.

FIG. 11 is a flowchart showing a processing of selecting a reference signal based on the number of access points which receive signals when a plurality of reference signals are received.

Upon receiving of reference signals 6, each access point 3 measures reception timings of reference signals 6 (S30). Next, each access point 3 sends, to the position calculation server 4, a reference station ID obtained from each reference signal 6 and information regarding the reception timing difference between the positioning signal 5 and all the received reference signals 6(S31). The position calculation server 4 gathers information from all the access points used for position calculation (S32). The position calculation server 4 identifies a reference signal received by most access points, and executes position calculation by using the reception timing difference between the reference signal and the positioning signal, and position information of the reference station obtained based on the reference station ID from the reference signal (S33).

According to the first embodiment of this invention, the position of the node can be measured even when the node includes no receiver. Thus, it is possible to simplify the structure of the node and to miniaturize the node.

Since the position can be measured when the node sends the positioning signal once, it is possible to reduce the power consumption of the node.

Furthermore, since the access points need not be synchronized in time before the position of the node is measured, it is possible to measure the position of the node at a desired timing for the node. For example, it is possible to measure a position of the node at the moment when the node detects an abnormality.

Figure 12:
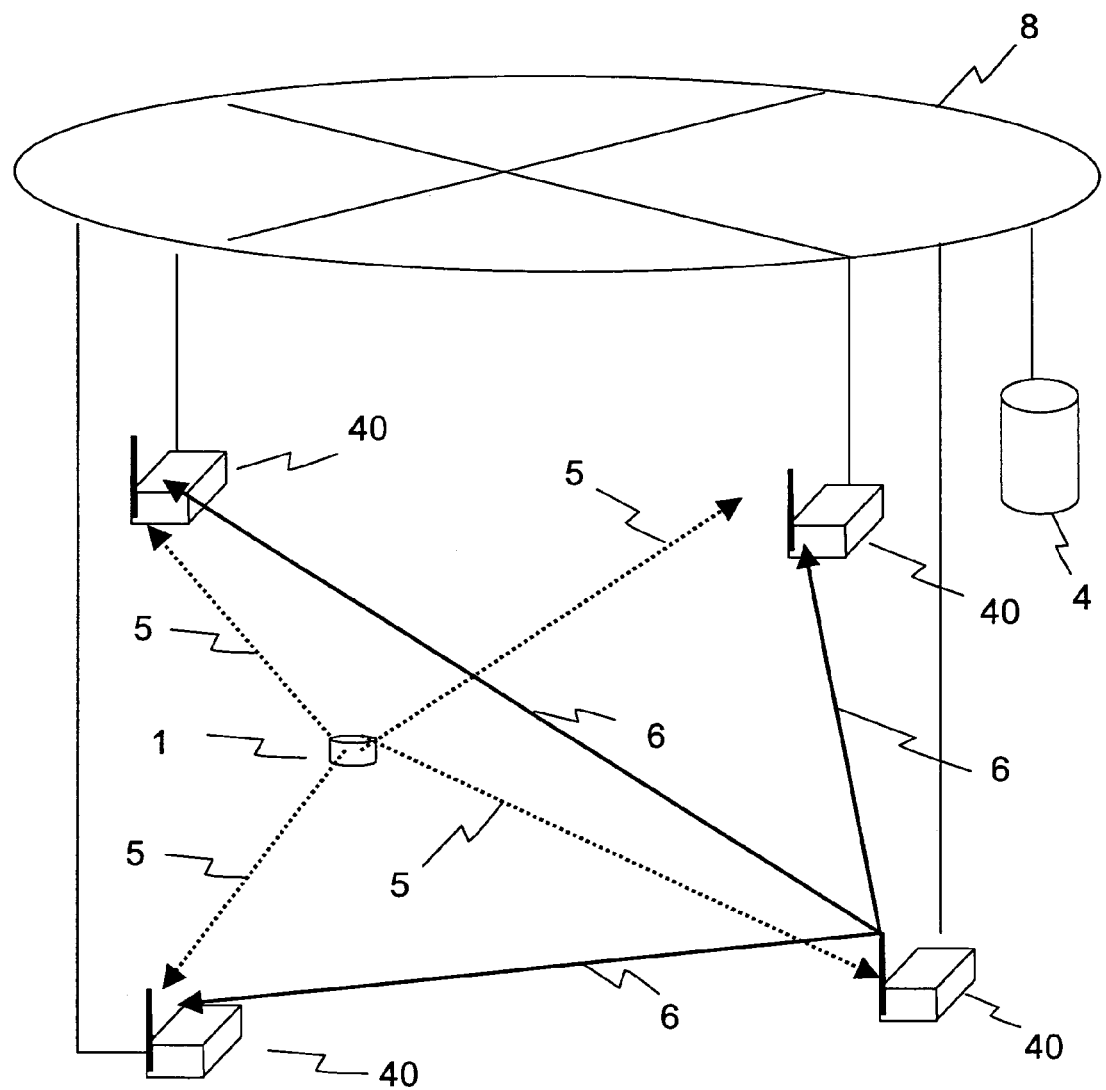
FIG. 12 is a configuration diagram of a positioning system according to a second embodiment of this invention.

FIG. 12 is a configuration diagram showing a positioning system according to a second embodiment of this invention.

In FIG. 12, the node 1 includes a transmitter which sends the positioning signal 5. An access point (AP) 40 includes a measuring module which measures a reception timing of the positioning signal 5, and a transmitter which sends the reference signal 6. The position calculation server 4 includes a database which includes a coordinates information of each access point 40. The position calculation server 4 is connected to each access point 40 through a network 8. The position calculation server 4 calculates a position of the node 1 by using a result of the measurement obtained from each access point 40 through the network 8, and the information stored in the database.

In the second embodiment, the access point 40 that includes a reference signal transmitter and a receiving timing measuring module. The access point 3 that only includes a receiving timing measuring unit may be used in combination.

A method of selecting the access points 40 to send a reference signal is similar to a method of selecting reference stations 2 used for position calculation by the access point 3 which receives the reference signals 6 from the plurality of reference stations 2 when there are the plurality of reference stations 2 in the first embodiment described above.

Specifically, upon receiving of the positioning signal 5, the access point 3 measures strength of the positioning signal 5. The access point 3 sends the reference signal 6 with a passage of a predetermined delay time from the receiving of the positioning signal 5. The predetermined delay time is shorter as a measured signal strength is higher, while the predetermined delay time is longer as a measured signal strength is lower. The access point 3 that receives the reference signal 6 sent from the other access point 3 before the passage of the predetermined delay time sends no reference signal 6 even after the passage of the predetermined delay time. Thus, the access point 40 sending the reference signal is selected.

According to the second embodiment, it is possible to calculate the position of the node 1 by using the reception timing of the positioning signal 5 and the reception timing of the reference signal 6, similar to that of the first embodiment.

As in the case of a third embodiment, when the node 1 that sends a positioning signal includes a transceiver to communicate with the access point 40, the access point 40 with which the node 1 is in communication may be selected as a reference station. And the selected access point 40 alone may send the reference signal 6.

According to the second embodiment, in addition to the effects of the first embodiment, costs of the system configuration can be reduced since the access points of identical configurations only need be distributed.

Figure 13:
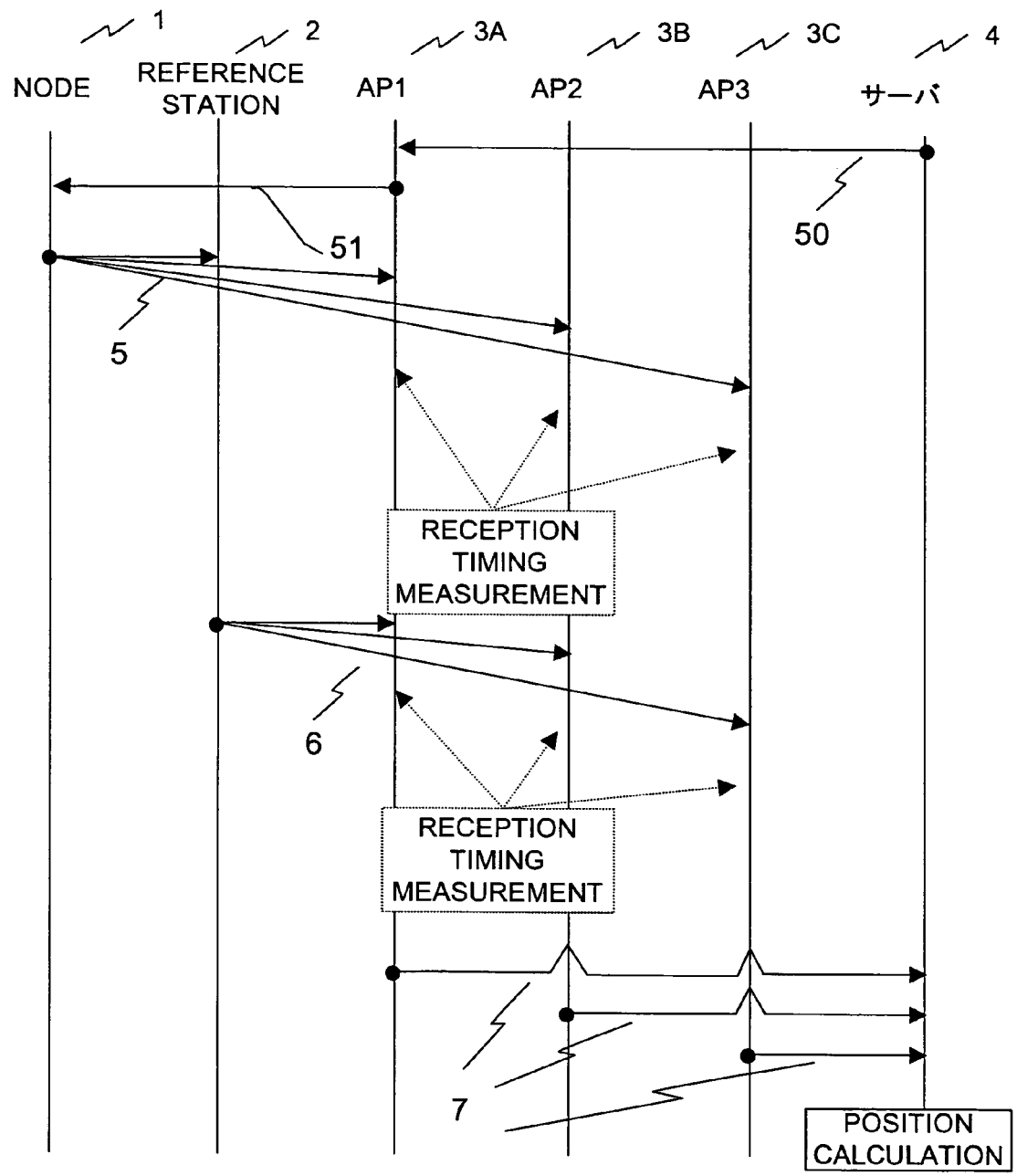
FIG. 13 is a sequential diagram of a signal transmission process in the positioning system according to a third embodiment of this invention.

FIG. 13 is a sequential diagram showing a signal transmission process in the positioning system according to a third embodiment of this invention. In third embodiment, the node 1 includes a transceiver to communicate with the access point 3. FIG. 13 shows a case that node 1 receives an instruction from the position calculation server 4, and sends a positioning signal.

The position calculation server 4 sends a positioning request 50 to an access point 3a which is in communicate with the positioning target node 1. Upon receiving of the positioning request 50, the access point 3a sends a positioning instruction 51 to the node 1. The node 1 that has received the positioning instruction 51 sends the positioning signal 5 to the surrounding access point 3 and the surrounding reference station 2. Thereafter, a position of the node 1 is calculated by using a procedure similar to that described above in FIG. 9.

When it is determined that the position calculation server 4 cannot calculate a valid node position, e.g., calculated coordinates of the node 1 are outside a measuring range, the positioning request 50 for the node 1 may be sent again.

According to the third embodiment, in addition to the effects of the first embodiment, it is possible to calculate the position of the node 1 in response to a request from the base station side (position calculation server 4, or terminal which needs a position of the other node 1).

This invention can be used for a wireless LAN system which calculates a position of a node, especially a node position calculation system where power consumption is reduced by a simple configuration.

For example, this invention can be used for a hydrogen leakage alarm system of a hydrogen station which supplies a hydrogen gas to a fuel-cell vehicle. According to this system, a node including a hydrogen sensor (sensor node) is distributed in an optional place, or carried by an operator to detect hydrogen leakage. The sensor node sends a positioning signal immediately after detection of a hydrogen gas, and a surrounding access point measures its reception timing. Next, a reference station that receives the positioning signal from the sensor node sends a reference signal, and its reception timing is similarly measured at each access point. Each access point sends a reception timing notification including results of the measurements to a server connected through a wired network.

The server calculates an abnormality detecting position of the sensor node based on the reception timing notification, a coordinates information of each access point, and a distance from each access point to the reference station.

According to the hydrogen leakage alarm system, even when the position of the sensor node is changed, it is not necessary to update system information as long as the position of the access point is not changed. Since positioning can be executed without a receiver in the sensor node, a carrying method involving miniaturizing the sensor node and incorporating it in, e.g., a nametag of the operator can be realized. Since the access points need not be synchronized in time before the positioning, it is possible to know a position of the sensor node at the moment when the hydrogen sensor detects an abnormality. Moreover, since a position of the operator is not traced until the sensor detects an abnormality, it is possible to secure privacy of the operator.

While the present invention has been described in detail and pictorially in the accompanying drawings, the present invention is not limited to such detail but covers various obvious modifications and equivalent arrangements, which fall within the purview of the appended claims.

What is claimed is:

1. A method of measuring a position of a node by using a radio communication system which includes the node to send a position measuring signal, and a plurality of access points to receive radio signals from the node, the method comprising:
   causing the access points to monitor the position measuring signal from the node through a predetermined channel;
   causing each of at least two of the access points to send a reference signal after receiving the position measuring signal;
   causing at least three of the access points to measure respective reception timings of the position measuring signal and respective reception timings of the reference signal; and
   calculating the position of the node by using the reception timings of the position measuring signal and the reception timings of the reference signal measured by the access points which received the position measuring signal and the reference signal, and position information of the access points which received the position measuring signal and the reference signal,
   wherein the at least one of the access points sends the reference signal with a passage of a predetermined delay time after receiving the position measuring signal, the predetermined delay is set to be longer as a strength of the received position measuring signal is lower, and the position of the node is calculated by using a reference signal first received among reference signals sent by each of at least two of the access points.

2. The method according to claim 1, wherein each of at least two of the access points that sends the reference signal is an access point to communicate with the node.

3. The method according to claim 1, wherein each of at least two of the access points sends the reference signal with a passage of a predetermined delay time after receiving the position measuring signal, and sends no reference signal when a reference signal sent from another access point is received before the passage of the predetermined delay time, and wherein the predetermined delay time is set to be longer as a strength of the received position measuring signal is lower.

4. The method according to claim 1, wherein
   each of at least two of the access points sends the reference signal a plurality of times,
   the access points that received the reference signal measure reception timings of the reference signal sent the plurality of times, and
   the position of the node is calculated by using an average of the reception timings of the reference signal sent the plurality of times.

5. The method according to claim 1, wherein
   upon receiving reference signals sent from the plurality of access points, the access points that received the reference signal measure strengths of the reference signals received,
   a sum of the strengths of the reference signals received is obtained for each of the reference signals, and
   the position of the node is calculated by using a reference signal having the highest sum of the strengths.

6. The method according to claim 1, wherein when an access point receives reference signals sent from the plurality of access points, a number of access points which received each of the reference signals is counted on for each of the reference signals, and the position of the node is calculated by using a reference signal received by the largest number of access points.

7. A node position measuring system comprising:
   a node which sends a position measuring signal; and
   a plurality of access points which monitor for radio signals from the node, wherein:
   each of the access points comprises a signal reception timing measuring module which receives the position measuring signal from the node through a predetermined channel;
   each of at least two of the access points comprises a reference signal generating module which sends a reference signal after the signal reception timing measuring module receives the position measuring signal
   at least three of the access points measure respective reception timings of the position measuring signal and respective reception timings of the reference signal by the respective signal reception timing measuring modules; and
   a position calculating module which calculates a position of the node by using the reception timings of the position measuring signal and the reception timings of the reference signal measured by the access points which received the position measuring signal and the reference signal, and position information of the access points which received the position measuring signal and the reference signal, and
   wherein the at least one of the reference signal generating modules sends the reference signal with a passage of a predetermined delay time set to be longer as a strength of the received position measuring signal is lower, and the position calculating module calculates the position of the node by using a reference signal first received among reference signals sent by each of at least two of the access points.

8. The node positioning measuring system according to claim 7, wherein an access point that communicates with the node comprises the reference signal generating module which sends the reference signal after the access point that communicates with the node receives the position measuring signal.

9. The node positioning measuring system according to claim 7, wherein the reference signal generating module sends the reference signal with a passage of a predetermined delay time after the receiving of the position measuring signal, and sends no reference signal when a reference signal sent from another access point is received before the passage of the predetermined delay time, and wherein the predetermined delay time is set to be longer as a strength of the received position measuring signal is lower.

10. The node positioning measuring system according to claim 7, wherein the reference signal generating module sends the reference signal a plurality of times, the signal reception timing measuring modules of the at least three access points measure reception timing of the reference signal sent the plurality of times, and the position calculating module calculates the position of the node by using an average of the reception timings of the reference signal sent the plurality of times.

11. The node positioning measuring system according to claim 7, wherein upon receiving reference signals sent from the plurality of access points, each signal reception timing measuring module measures strengths of the reference signals received, and the position calculating module sums up the strengths of the reference signals received for each of the reference signals, and calculates the position of the node by using a reference signal having the highest sum of the strengths.

12. The node positioning measuring system according to claim 7, wherein each signal reception timing measuring module receives reference signals sent from the plurality of access points, the position calculating module counts a number of access points which received each of the reference signals for each of the reference signal, and calculates the position of the node by using a reference signal received by the largest number of access points.

13. A radio access point in a node positioning system which measures a position of a node to send a position measuring signal, comprising a signal reception timing measuring module and a communication unit, wherein the signal reception timing measuring module monitors the position measuring signal from the node through a predetermined channel, measures a reception timing of the position measuring signal, and measures reception timings of a reference signal sent from another access points after receiving the position measuring signal; and the communication unit sends the reception timing of the position measuring signal and the reception timing of the reference signal or a reception timing difference between the position measuring signal and the reference signal to a position calculating module which calculates a position of the node by using information regarding the reception timings of a reference signal first received among the reference signals sent by other access points and position information of at least three of access points which received the position measuring signal and the reference signal, and wherein the at least one of other access points sends the reference signal a passage of a predetermined delay time after receiving the position measuring signal, and the predetermined delay is set to be longer as a strenght of the received position measuring signal is lower.

14. The radio access point according to claim 13, further comprising a reference signal generating module which sends a reference signal after the signal reception timing measuring module receives the position measuring signal.

15. The radio access point according to claim 14, wherein the reference signal generating module sends the reference signal with a passage of a predetermined delay time after receiving the position measuring signal, and sends no reference signal when a reference signal sent from another access point is received before the passage of the predetermined delay time, and wherein the predetermined delay time is set to be longer as a strength of the received position measuring signal is lower.

16. The node position measuring system according to claim 7, wherein the node receives an instruction to send the position measuring signal and sends the position measuring signal.

17. A node position measuring system, comprising:

a node which sends a position measuring signal;

a plurality of reference stations each of which sends a reference signal; and a plurality of access points which monitor radio signals from the node, wherein each of the access points comprises a signal reception timing measuring module which receives the position measuring signal from the node through a predetermined channel, each of the reference stations sends the reference signal after the position measuring signal is received, and at least three of the access points receive the position measuring signal and the reference signal, and measure a reception timing of the position measuring signal and reception timings of the reference signals by the respective signal reception timing measuring modules, and wherein the node position measuring system further comprises a position calculating module which calculates a position of the node by using the reception timings of the position measuring signal and the reception timings of the reference signal measured by the access points which received the position measuring signal and the reference signal, and position information of the at least three of the access points, and wherein the at least one of reference stations sends the reference signal with a passage of a predetermined delay time set to be longer as a strength of the received position measuring signal is lower, and the position calculating module calculates the position of the node by using a reference signal first received among reference signals sent by each of the plurality of the reference stations.

18. The node positioning measuring system according to claim 17, wherein the reference station sends the reference signal with a passage of a predetermined delay time after the receiving of the position measuring signal, and sends no reference signal when a reference signal sent from another reference station is received before the passage of the predetermined delay time, and wherein the predetermined delay time is set to be longer as a strength of the received position measuring signal is lower.

19. The node positioning measuring system according to claim 17, wherein the reference station sends reference signals a plurality of times, the signal reception timing measuring modules of the at least three access points measure reception timings of the reference signals sent the plurality of times, and the position calculating module calculates the position of the node by using an average of the reception timings of the reference signals sent the plurality of times.

20. The node positioning measuring system according to claim 17, wherein upon receiving reference signals sent from a plurality of reference stations, the signal reception timing measuring modules of the at least three access points measure strengths of the reference signals received, and the position calculating module sums up the strengths of the reference signals for each of the reference signal, and calculates the position of the node by using a reference signal having the highest sum of the strengths.

21. The node positioning measuring system according to claim 17, wherein the signal reception timing measuring module receives reference signals sent from a plurality of reference stations, the position calculating module counts a number of access points which received each of the reference signals for each of the reference signal, and calculates the position of the node by using the reference signal received by the largest number of access points.

22. The node position measuring system according to claim 17, wherein the node receives an instruction to send the position measuring signal and sends the position measuring signal.

23. A method of measuring a position of a node by using a radio communication system which includes the node to send a position measuring signal, a plurality of reference stations to send a reference signal, and a plurality of access points to receive radio signals from the node, the method comprising:

causing the access points to monitor the position measuring signal from the node through a predetermined channel;

causing each of the reference stations to send the reference signal after receiving the position measuring signal;

causing at least three of the access points to measure respective reception timings of the position measuring signal and respective reception timing of the reference signal; and calculating the position of the node by using the reception timings of the position measuring signal and the reception timings of the reference signal measured by the access points which received the position measuring signal and the reference signal, and position information of the at least three of the access points, wherein the at least one of reference stations sends the reference signal with a passage of a predetermined delay time after receiving the position measuring signal, the predetermined delay is set to be longer as a strength of the received position measuring signal is lower, and the position of the node is calculated by using a reference signal first received among reference signals sent by each of the plurality of the reference stations.

* * * * *

UNITED STATES PATENT AND TRADEMARK OFFICE
CERTIFICATE OF CORRECTION

| | | |
|---|---|---|
| PATENT NO. | : 7,627,329 B2 | Page 1 of 1 |
| APPLICATION NO. | : 10/973289 | |
| DATED | : December 1, 2009 | |
| INVENTOR(S) | : Mizugaki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Twenty-first Day of December, 2010

David J. Kappos
*Director of the United States Patent and Trademark Office*